United States Patent
Schreher

(10) Patent No.: US 7,352,445 B2
(45) Date of Patent: Apr. 1, 2008

(54) ELECTRONICALLY GENERATING AN OUTLINE INDICATING THE SIZE OF AN ENERGY ZONE IMAGED ONTO THE IR DETECTOR OF A RADIOMETER

(75) Inventor: Medwin E. Schreher, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 11/416,689

(22) Filed: May 2, 2006

(65) Prior Publication Data
US 2006/0198421 A1 Sep. 7, 2006

Related U.S. Application Data

(63) Continuation-in-part of application No. 10/776,385, filed on Feb. 10, 2004, now Pat. No. 7,164,467.

(51) Int. Cl.
*G01C 3/08* (2006.01)
(52) U.S. Cl. .................................... 356/4.03
(58) Field of Classification Search ............... 356/4.03
See application file for complete search history.

(56) References Cited

U.S. PATENT DOCUMENTS

| | | | |
|---|---|---|---|
| 3,856,399 A | 12/1974 | Hosoe et al. | |
| 4,343,182 A | 8/1982 | Pompei | |
| 4,494,881 A | 1/1985 | Everest | |
| 4,739,560 A | 4/1988 | Akutsu et al. | |
| 5,133,605 A | 7/1992 | Nakamura | |
| 5,368,392 A | 11/1994 | Hollander et al. | |
| 5,742,379 A | 4/1998 | Reifer | |
| 6,234,669 B1 | 5/2001 | Kienitz | |
| 2006/0050766 A1* | 3/2006 | Hollander et al. | 374/121 |

FOREIGN PATENT DOCUMENTS

EP        0602868    *  6/1994

* cited by examiner

*Primary Examiner*—Thomas H. Tarcza
*Assistant Examiner*—Luke D. Ratcliffe
(74) *Attorney, Agent, or Firm*—Charles E. Krueger

(57) ABSTRACT

A radiometer includes a sighting system that generates a digital image of an object surface having an area that is to be imaged onto the IR detector. A shape outline is overlaid on the digital image of an object surface to indicate the extent of the energy zone that is imaged onto the IR detector. A distance entering interface is used to enter distance data indicating the distance between the radiometer and the object surface and the distance data is utilized to determine the size of the overlaid shape.

11 Claims, 4 Drawing Sheets

ELECTRONICALLY GENERATING AN OUTLINE INDICATING THE SIZE OF AN ENERGY ZONE IMAGED ONTO THE IR DETECTOR OF A RADIOMETER

RELATED APPLICATIONS

This application is a continuation-in-part (CIP) of the commonly-assigned patent application entitled METHOD AND APPARATUS FOR ELECTRONICALLY GENERATING AN OUTLINE INDICATING THE SIZE OF AN ENERGY ZONE IMAGED ONTO THE IR DETECTOR OF A RADIOMETER, filed Feb. 10, 2004, application Ser. No. 10/776,385 which is hereby incorporated by reference for all purposes.

BACKGROUND OF THE INVENTION

The invention relates to a device for remote or non-contact temperature measurement. Such a device, which is known in the art as a radiometer, performs non-contact temperature measurement and comprises a detector for receiving heat radiation emanating from an energy zone on an object surface of an object of measurement, an infrared (IR) optical system for imaging the heat radiation emanating from the energy zone onto the detector, and a sighting arrangement for projecting visible light onto the object to identify the position and size of the energy zone on the object of measurement. A further processing arrangement which converts the detector signal into a temperature indication is also connected to the detector.

In this case the IR optical system is so designed that at a certain measurement distance for the most part only heat radiation from a certain area of the object of measurement, namely the energy zone, is focused onto the detector. In most cases the size of the energy zone is defined by the area from which 90% of the heat rays focused onto the detector are emitted. However, applications are also known in which there are reference to values between 50% and 100%.

The pattern of the dependence of the size of the energy zone upon the measurement distance depends upon the design of the IR optical system. A fundamental distinction is made between distant focusing and close focusing. In distant focusing the IR optical system images the detector into infinity and in close focusing it images it onto the focus plane at a finite distance. In the case of distant focusing it is necessary to deal with an energy zone size which grows linearly with the measurement distance, whereas in close focusing the energy zone size can decrease between the radiometer and the focus plane.

In non-contact temperature measurement it is indispensable in practical use that the energy zone on the object to be examined should be rendered visible in a suitable way. In the past, various attempts were made to render the position and size of the energy zone, which is invisible per se, visible by illumination. According to JP-A-47-22521 a plurality of rays which originate from several light sources or are obtained by reflection from a light source are directed along the marginal rays of a close-focused optical system onto the object of measurement. In this way the size and position of the energy zone for a close-focused system can be rendered visible by an annular arrangement of illuminated points around the energy zone.

U.S. Pat. No. 5,368,392 describes various methods of outlining energy zones by laser beams. These include the mechanical deflection of one or several laser beams as well as the splitting of a laser beam by a beam divider or a fiber optic system into several single beams which surround the energy zone. However, these sighting arrangements can only be used in an optical system which images into infinity. In an optical system which images into the finite an image of the detector is reduced and then enlarged by the optical system along an optical axis onto an energy zone on the object from the optical system to the so-called sharp point energy zone.

In U.S. Pat. No. 6,234,669, which is assigned to the assignee of the present application, a device for non-contact temperature measurement of an object is described with an IR optical system in which an image of the detector along an optical axis is imaged onto an energy zone on the object in such a way that the image of the detector decreases in size between the optical system and a sharp point focus zone and then enlarges. A sighting arrangement is also described which identifies the outer limit of the energy zone by means of visible sighting rays. Each sighting ray is aligned obliquely with respect to the optical axis in such a way that each sighting ray can be used both before and also after the sharp point energy zone to identify the energy zone.

Accordingly, improved systems for indicating the extent of the energy zone to a user are the subject of active investigation in the industry.

BRIEF SUMMARY OF THE INVENTION

In one embodiment of the invention, a digital imaging system is utilized to provide an image of the object surface having an area whose temperature is to be measured by a radiometer. A circle is overlaid on the displayed image of the object surface to indicate the extent of the energy zone.

In another embodiment of the invention, a distance entering interface is used to enter distance data indicating the distance between the radiometer and the object surface. An image controller utilizes the distance data to overlay a circle having the correct diameter to indicate the extent of the energy zone.

In another embodiment of the invention, data for generating circles of different diameters is stored in non-volatile memory. The distance data is utilized to select correct circle data for generating a circle having the, correct diameter to indicate the extent of the energy zone.

In another embodiment of the invention, the distance entering interface is a numeric keypad.

In another embodiment of the invention, the distance entering interface is a graphical user interface.

In another embodiment of the invention, the distance entering interface and/or the display may be remote from the radiometer.

In another embodiment of the invention, an energy zone outline is processed by a controller and not displayed.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Various embodiments of the invention implement a sighting system for radiometers with a close focus point. For these types of radiometers, the IR beam profile starts with a large beam diameter at the instrument, which gets smaller and smaller as the distance diminishes to the focus point, where it reaches a minimum, then it grows again. For non-contact temperature measurement, knowledge of the beam diameter size at a given distance is important since it is the size of the beam diameter at the intersection of the beam and the object surface that defines the energy zone.

A first embodiment will now be described that uses a video camera and an electronic display which shows an image of the object being measured. A circle is electronically generated and overlaid over the image of the object being measured to indicate the true energy zone position and diameter on the display. The size and diameter of the circle are calculated inside the instrument from the known beam profile and the distance between the measured object surface and the radiometer. In this embodiment, in addition to showing the correct spot size, the offset between the video camera and the infrared channel is also compensated. The same electronic display can show the measured temperature, set parameters of the instrument, and other information such as maximum temperature, minimum temperature, time, and so on.

Figure 1:
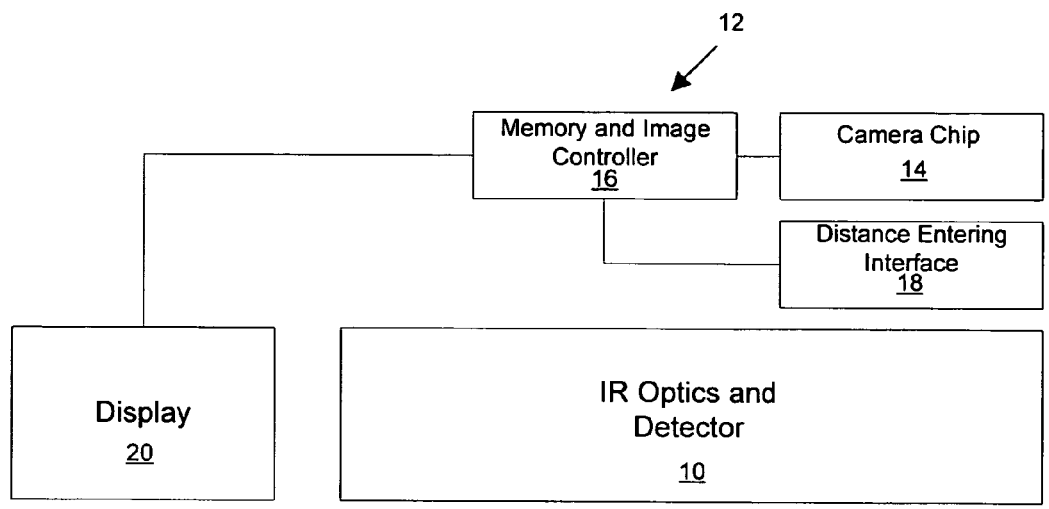
FIG. 1 is a high-level block diagram depicting an embodiment of the invention.

FIG. 1 is a high level block diagram of this embodiment. In this embodiment a standard radiometer 10 including IR optics and a detector can be designed as disclosed in commonly-assigned U.S. Pat. No. 5,836,694 which is hereby incorporated by reference for all purposes. A video sighting system 12 includes a Camera Chip 14, a Memory and Image Controller block 16, a distance entering interface 18, and a Display 20.

Figure 2:
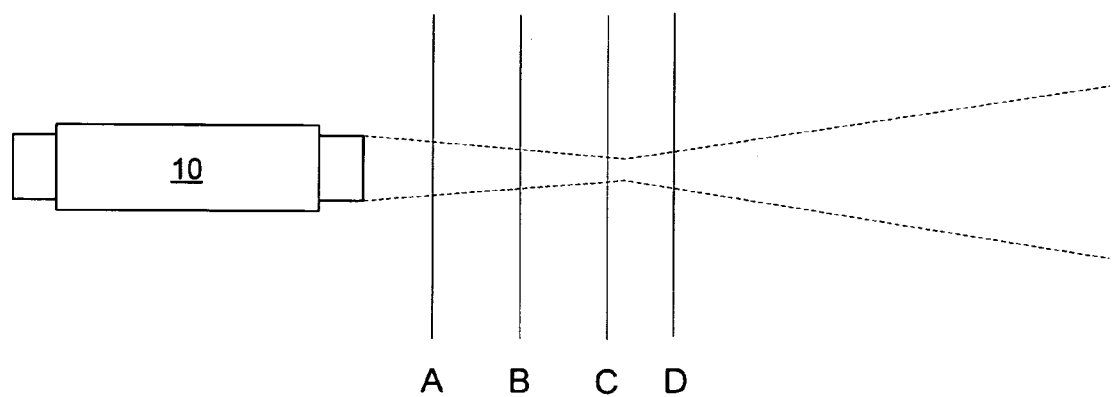
FIG. 2 is a view depicting the focusing characteristics for a near focus system.

As described above, the energy zone is the area on an object that is imaged onto the IR detector. FIG. 2 depicts a cross-section of the beam profile for a near-focus radiometer. The vertical lines A, B, C, and D represent objects at three different image planes.

Figure 3:
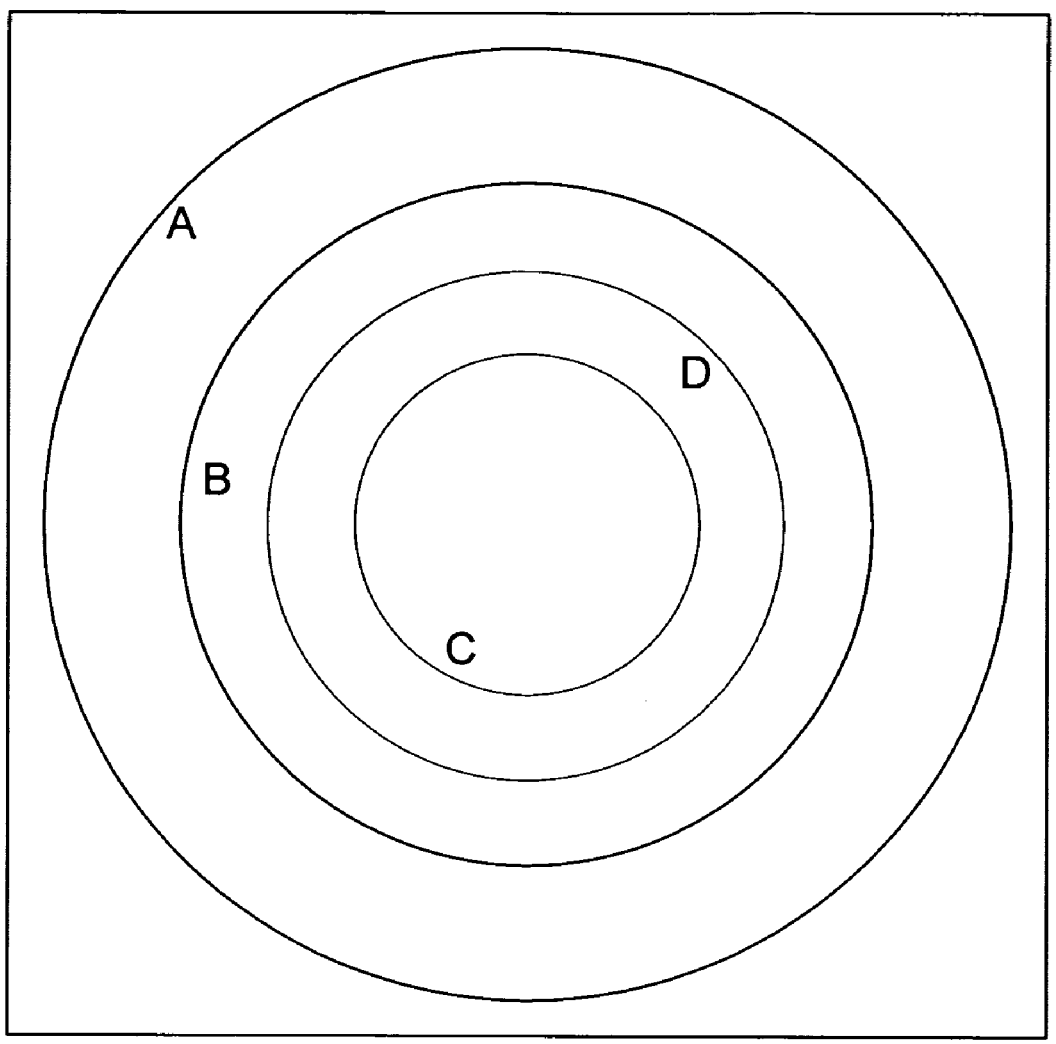
FIG. 3 is a diagram depicting the size of the energy zone at different distances.

FIG. 3 depicts the display device with circles superimposed over the image of an object surface generated by the imaging system. The circles A, B, C or D correspond to the size of the energy zone on the object when the object is positioned at image plane A, B, C or D in FIG. 2. Accordingly, the size of the circle is determined by the distance of the object from the radiometer. In this example, the size of the circles decreases with increasing distance from the radiometer because all the image planes are located between the radiometer and the sharp focus spot.

Figure 4:
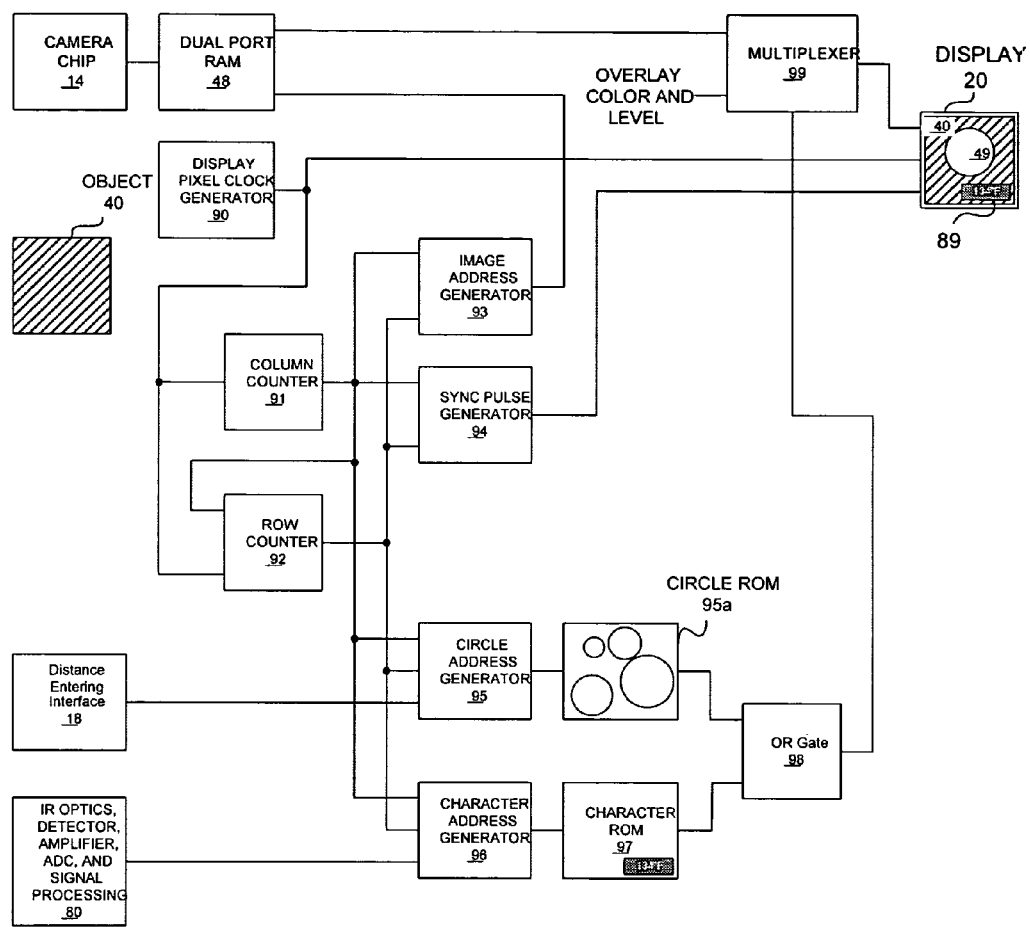
FIG. 4 is a block diagram of an embodiment of the invention.
Figure 5:
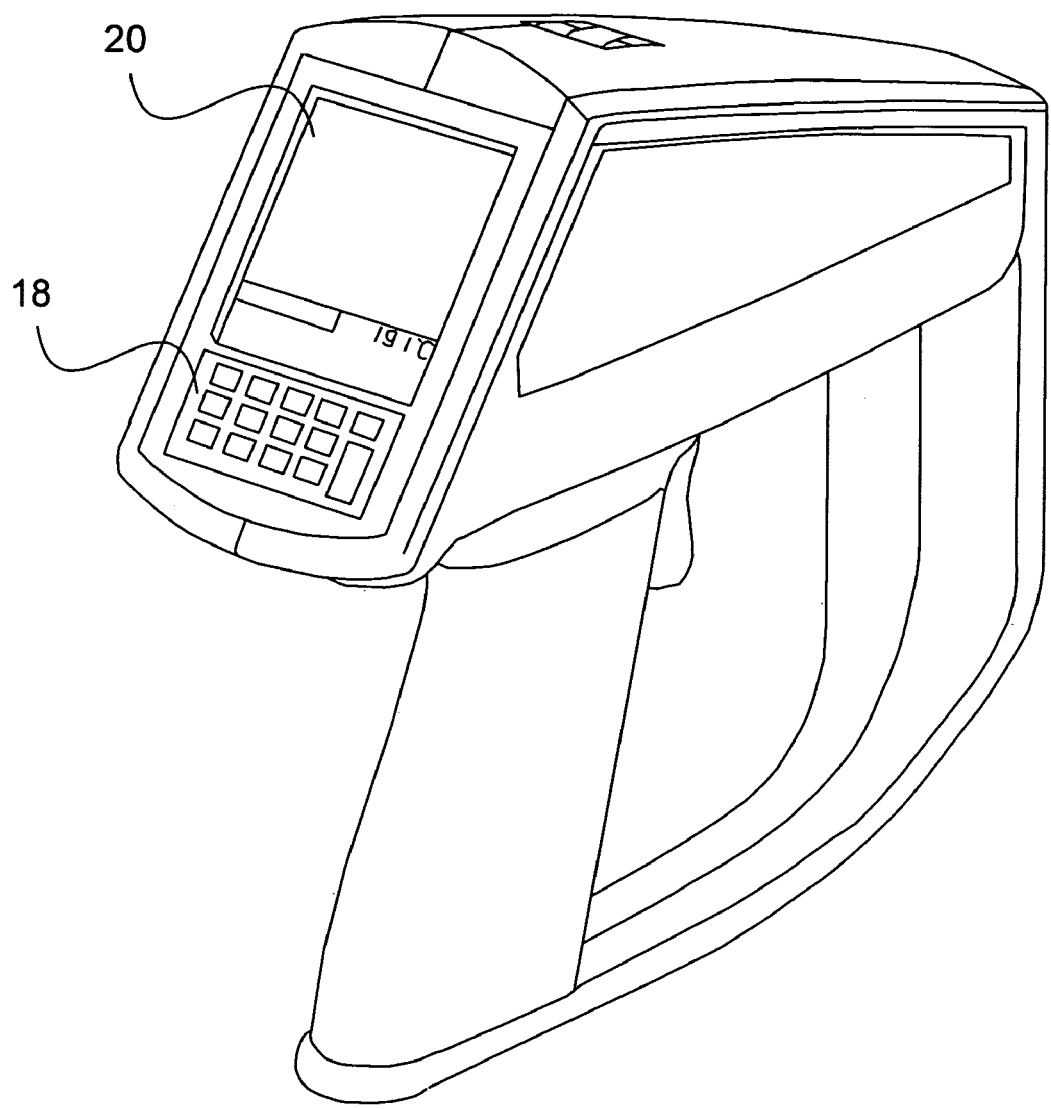
FIG. 5 is perspective view of a product configuration for use with an embodiment of the invention.

The operation of an embodiment of the invention will now be described with reference to FIG. 4. In FIG. 4 the object surface to be imaged is a rectangular surface 40. As described above, the rays emitting from a circular energy zone of the object will be imaged onto the IR detector and the temperature of the part of the object surface included in the energy zone will be calculated by the radiometer.

The sighting system includes the Camera Chip 14, and the distance entering interface 18, and a Dual Port RAM 48. The image of the surface 40 is stored in the Dual Port RAM 48. The display system includes a Display Pixel Clock Generator 90, a Column Counter 91, a Row Counter 92, an Image Address Generator 93, a Sync Pulse Generator 94, a Circle Address Generator 95, a Circle ROM 95a, a Character Address Generator 96, a Character ROM 97, an OR Gate 98, a Multiplexer 99, and the Display 20.

The Pixel Clock generator 90 generates the pixel clock for the Display 20, the Column Counter 91, and the Row Counter 92. The Row Counter 92 changes state only at the end of a display line. The outputs of the Column Counter 91 and the Row Counter 92 are combined in the Image Address Generator 93 to generate the display image address. The display image address determines the output of the Dual Port RAM 48. The output of the Dual Port RAM 48 is usually passed to the Display 20 via the Multiplexer 99.

The outputs of the Column Counter 91 and the Row Counter 92 are also combined in the Sync Pulse Generator 94 to generate horizontal and vertical sync pulses for the display. This circuitry allows for different pixel clocks as well as different numbers of columns and rows for the Camera Chip 14 and the Display 20.

An inactive select-input of the Multiplexer 99 causes the images data from the Dual Port RAM to be passed through to the display, so that the object surface 40 is displayed on the Display 20. An active select-input of the Multiplexer 99 puts a fixed input signal with regard of color and brightness (level) to the input of the Display 20, so that the display shows a pixel or pixels with this color and brightness instead of the object surface 40.

Thus, by controlling the select-input of the Multiplexer 99 synchronously with the pixel clock and the state of the Column Counter 91 and the Row Counter 92, any geometric FIG. 49 or text 89 can be shown on the Display 20 as an overlay.

The Circle ROM 95a stores circle data for generating images of different size circles with an output of the Circle ROM 95a coupled via the OR gate 98 the select-input of the Multiplexer 99. The outputs of the Column Counter 91, the Row Counter 92, and the distance entering interface 18 are combined in the Circle Address Generator to provide the address data for the Circle ROM 95a.

The stored circles in the Circle ROM 95a have sizes that, when overlaid on the object image, indicate the extent of the displayed object surface included within the energy zone for a particular object distance. The selection of which of the circles, stored in the Circle ROM 95a, to overlay is defined by the input from the distance entering interface 18. In this embodiment, the distance data entered is coupled to the circle address generator 95.

The Circle ROM 95a is programmable and for a particular device responds to distance data entered using the distance entering interface 18 to select the correct circle data that indicates the correct size of the energy zone when overlaid on the image of the object surface provided by the Camera Chip 14. The Circle ROM 95a is also programmed to position the selected circle within the display to compensate for parallax due to misalignment between the optical axes of the IR optical system and the video camera system.

The Character ROM 97 stores data for generating text to indicate the object surface temperature. The IR Optics, Detector, and analog and digital signal processing chain 80 measures the IR signal, transmitted from the object surface, calculates the object surface temperature and provides a digital signal, which represents the object surface temperature. This signal is combined with the outputs of the Column Counter 91 and the Row Counter 92 inside the Character Address Generator to provide the address data for the Character ROM 97. The output of the Character ROM 97 controls via the OR gate 98 the select-input of the Multiplexer 99 to overlay the object surface temperature 89 information on the Display 20.

Because of the inclusive coupling of the outputs of the Circle ROM 95a and the Character ROM 97 both can be overlaid: a circle to show the zone of energy collection and text to indicate the object surface temperature.

The Display 20 in this embodiment is an LCD display. As depicted in FIG. 4, the Display Chip overlays a circle onto the image of the object surface to indicate the portion of the object surface included in the energy zone 49 as well as the temperature information 89. Other types of displays such as plasma, LED, etc. can also be utilized.

In this embodiment, the components Column Counter 91, Row Counter 92, Image Address Generator 93, Sync Pulse Generator 94, Circle Address Generator 95, Character Address Generator 96, Or Gate 98, and Multiplexer 99 are combined in a single complex programmable logic chip (CPLD) 46. Also the Circle ROM 95a and the Character ROM 97 are combined in a single Flash ROM chip. The IR signal processing chain 80 are combined in a single microcontroller chip.

In the one embodiment, the distance is entered via the distance entering interface 18 which may be in the form of a numeric, calculator-like keypad. In this embodiment the user keys in the distance between the radiometer and object to be measured. An optional unit-selecting switch allows a choice between English and metric systems. Alternative distance entering interfaces such as a touchpad having keys indicating specific distance or a Graphical User Interface (GUI).

FIG. 6 depicts a product configuration for use with an embodiment of the invention which includes a housing having an integral grip and a digital display device formed therein. The distance entering interface 18 is in the form of a numeric, calculator-like, key pad and the display 20 in an LCD screen. The IR optical system and digital imaging system are internal and not visible in the diagram.

Alternatively, instead of the user interface and display being integrated into the unit, as depicted in FIG. 6, the user interface and/or the display may be remote from the unit. For example, the radiometer may be part of a control system with the user interface and/or display located on a remote control panel in a control room. Data and control information could be transferred between the unit and the control panel by various means such as wireless communication, e.g., Bluetooth, infrared, cable, or by other means.

Further, the distance information entered by a user could be processed by a controller programmed with the size and location of the energy zone at various distances relative to a video image acquired by the system and the controller could automatically align the system. In this case, the computer would not generate a visible image for the user to view.

The various functional blocks depicted in the figures may be implemented as software including program code, stored on a computer readable medium, that is executed by a digital computer or by combinations of hardware and software. The computer readable medium may include, among other things, magnetic media, optical media, electro-magnetic fields encoding digital information, and so on.

Alternatives and substitutions will now be apparent to persons of ordinary skill in art. For example, the above-described embodiment employs an optical system that images a circular energy zone. However, the invention also applies to radiometers having optical systems that image other shapes such a ellipses, rectangles, etc. Further, the invention is equally applicable to systems having close focusing or distant focusing IR optics. Further, the system could be configured so that only the part of the image included within a shape outline is displayed. Also, other techniques are known for overlaying a geometric figure on an image and can be employed to implement different embodiments of the invention. Accordingly, it is not intended to limit the invention except as provided by the appended claims.

What is claimed is:

1. A system for indicating the location of an energy zone on an object surface, with the energy zone being an area on the object surface that is imaged onto an IR detector by the IR optical system included in a non-contact IR thermal measurement device, said system comprising:
   a video sub-system adapted to display a displayed image of at least a part of the object surface included in the energy zone and a part of the object surface not included in the energy zone;
   a distance entering interface adapted to enter distance data indicating the distance between the non-contact IR thermal measurement device and the object surface;
   a shape outline image generating sub-system, coupled to the distance entering interface, adapted to selectively output one of a plurality of shape outline digital images, each having a different dimension, in response to distance data entered with the distance entering interface; and
   an optical overlay sub-system, coupled to the shape outline image generating sub-system, adapted to overlay a shape outline digital image output by the image generating sub-system over the displayed image of the object surface and with an overlaid shape outline digital image indicating the part of the object surface included in the energy zone and with the shape outline digital image having a dimension determined by entered distance data.

2. The system of claim 1 where the distance entering interface comprises:
   a numeric keyboard.

3. The system of claim 1 where the distance entering interface comprises:
   a graphical user interface.

4. A system for indicating the location of an energy zone on an object surface, with the energy zone being an area on the object surface that is imaged onto an IR detector by the IR optical system included in a non-contact IR thermal measurement device, said system comprising:
   a video sub-system adapted to display a displayed image of at least a part of the object surface included in the energy zone and a part of the object surface not included in the energy zone, with the video sub-system comprising a digital image generating chip adapted to output digital image data, a display device adapted to display digital image data, and an image controller chip adapted to control the display device to display digital image data provided by the image generating chip;

a distance entering interface adapted to enter distance data indicating the distance between the non-contact IR thermal measurement device and the object surface;

an optical overlay sub-system, coupled to the distance entering interface, adapted to overlay a shape outline, having a dimension determined by entered distance data, over a displayed image of the object surface and with the shape outline indicating the extent of a displayed image included in the energy zone, with the optical overlay sub-system comprising a storage device for storing circle data utilized to form circle images of different diameters;

and with the image controller coupled to the storage device and the distance entering interface, programmed to select circle data from the storage device for generating a circle having a diameter size determined by the distance data provided by the distance entering interface.

5. The system of claim 1 where the shape outline is a circle.

6. The system of claim 1 where the distance entering interface and video sub-system are integrated into a single unit.

7. A method for indicating the location of an energy zone on an object surface, with the energy zone being an area on the object surface that is imaged onto an IR detector by the IR optical system included in a non-contact IR thermal measurement device, said method comprising the steps of:

acquiring a digital image of the object surface;

displaying a displayed digital image of the object surface with the displayed digital image including at least a part of the object surface included in the energy zone and a part of the object surface not included in the energy zone;

entering distance data indicating the distance to the object surface;

selectively outputting one of a plurality of shape outline digital images, each having a different dimension, in response to entered distance data; and overlaying an image outline digital image, having a dimension determined by entered distance data, over the digital image of the object surface to indicate the part of the object surface included in the energy zone.

8. The method of claim 7 where the step of selectively outputting further comprises the step of:

compensating for parallax between the acquired digital image and an optical axis of the IR optical system.

9. A system for indicating the location of an energy zone on an object surface, with the energy zone being an area on the object surface that is imaged onto an IR detector by the IR optical system included in a non-contact IR thermal measurement device, said system comprising:

means for acquiring a digital image of the object surface;

means for displaying a displayed digital image of the object surface with the displayed digital image including at least a part of the object surface included in the energy zone and a part of the object surface not included in the energy zone;

means for entering distance data indicating the distance to the object surface;

means for selectively outputting one of a plurality of shape outline digital images, each having a different dimension, in response to entered distance data; and means for overlaying an output image outline digital image, having a dimension determined by entered distance data, over the digital image of the object surface to indicate the part of the object surface included in the energy zone.

10. The system of claim 9 where the means for selectively outputting further comprises:

means for compensating for parallax between the acquired digital image and an optical axis of the IR optical system.

11. A system for indicating the location of an energy zone on an object surface, with the energy zone being an area on the object surface that is imaged onto an IR detector by the IR optical system included in a non-contact IR thermal measurement device, said system comprising:

a distance entering interface for entering distance data indicating the distance between the non-contact IR thermal measurement device and the object surface;

an image generating sub-system for acquiring an image of a part of the object surface;

a distance processing sub-system, coupled to the distance entering interface, for outputting a selected shape outline digital image included in a plurality of shape outline digital images to overlay the image, with the selected shape outline digital image having a dimension and position on the image determined by entered distance data and indicating the part of the image that shows only the part of the object included within the energy zone; and a display, coupled to the distance processing sub-system and image generating sub-system, for displaying only the part of the image included within the shape outline digital image overlaid on the display.

* * * * *